Oct. 1, 1957　　　　　A. STEINER　　　　2,808,015
SOLDERING MECHANISM
Filed May 23, 1955　　　　　　　　　　2 Sheets-Sheet 1
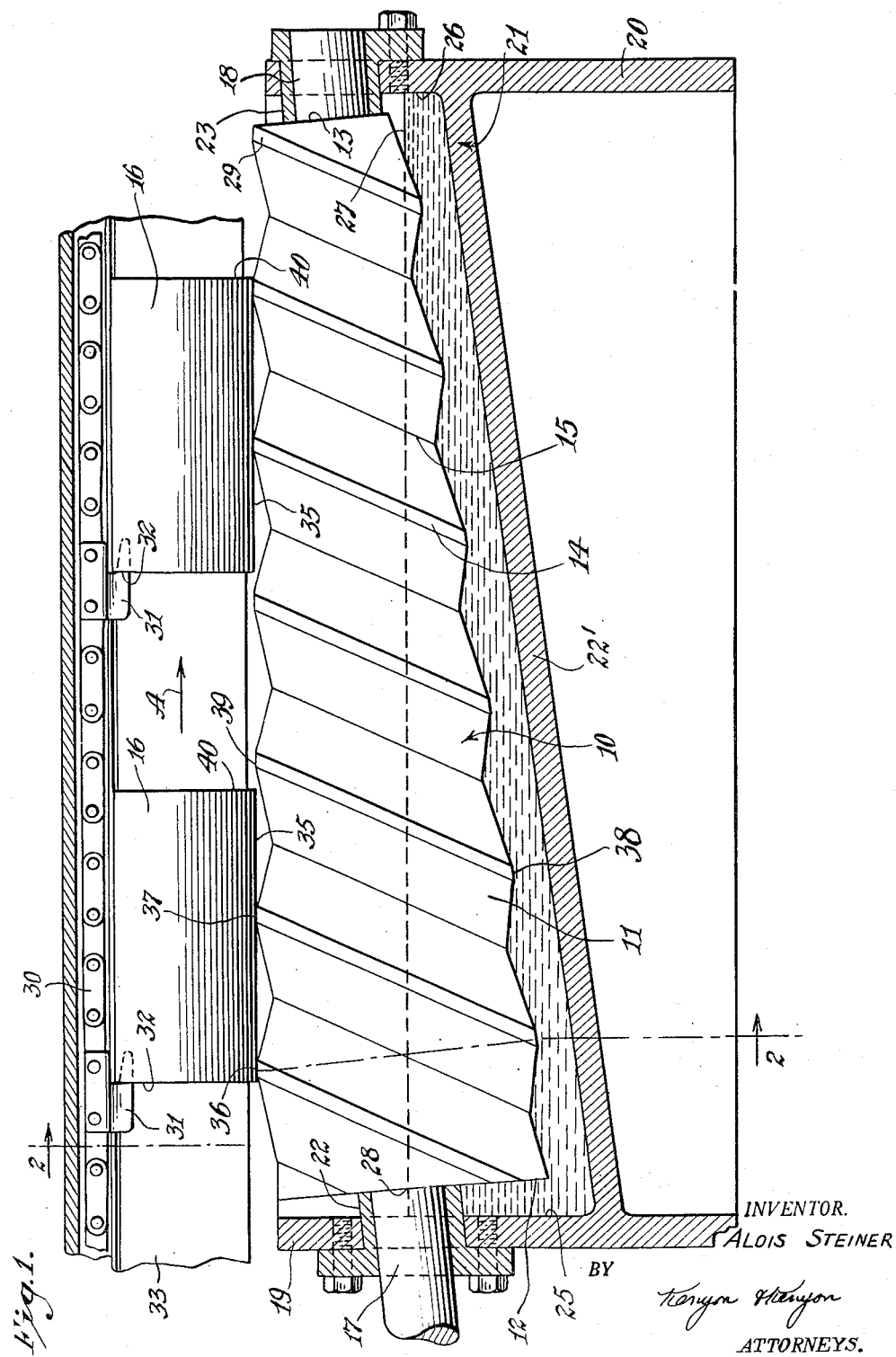
INVENTOR.
ALOIS STEINER
BY
Kenyon & Kenyon
ATTORNEYS.

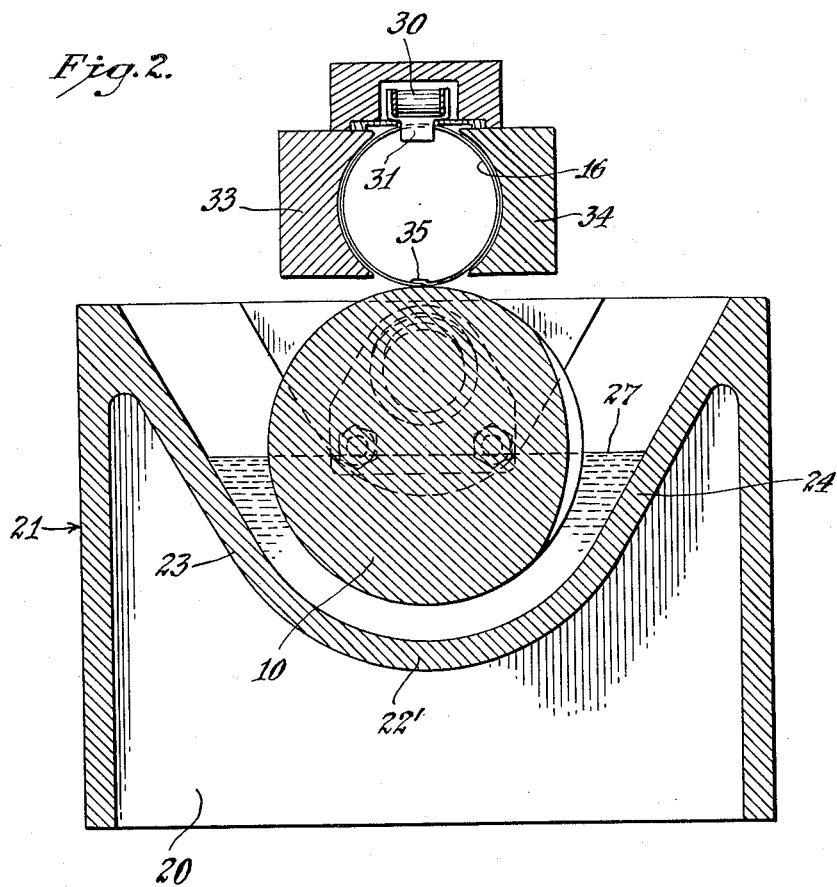

United States Patent Office 2,808,015
Patented Oct. 1, 1957

2,808,015

SOLDERING MECHANISM

Alois Steiner, Hoboken, N. J.

Application May 23, 1955, Serial No. 510,351

6 Claims. (Cl. 113—61)

This invention relates to a soldering mechanism and more particularly to a device for soldering the side seams of tin cans during their manufacture.

The device of the present invention comprises generally a bath of molten solder and a conical shaped solder roller rotatably disposed above such bath and partially immersed therein along its length. The roller has a raised helical thread along its surface which is immersible into said bath by rotation of the roller and it thereby acquires a coating of solder which is delivered to the side seams of tin cans being passed along the top of said roller in contact with said helical thread.

The body portion of the roller has a larger diameter receiving end and tapers to a smaller diameter discharge end. The roller is axially oriented relative to the bath so that the receiving end is immersed up to about its center or axis whereas the discharge end is disposed so that the helical thread at such latter end just dips into the surface of the bath. This novel arrangement causes the helical thread to pick up a substantial amount of solder at the receiving end but the pick-up decreases along such thread toward the discharge end until at the latter end such thread picks up just enough solder to keep itself properly tinned.

Therefore, as the side seam of the can is passed from the receiving end of the roller to the dicharge end, the helical thread initially deposits a greater amount of solder at the leading portion of the side seam and as the seam progresses in contact with the thread, less and less solder is being deposited in the seam until gradually the thread is actually wiping the excess solder from said seam as it passes the discharge end. Thus, with the present device it is not necessary to employ additional means such as rotary brushes to wipe away excess solder from the seam after it has been coated by the roller. Furthermore, the splattering of excess solder into the immediately following can, which was a concomitant disadvantage with the use of such brushes, is now eliminated.

During the heating of the can by contact with the solder roller the can tends to bend or bow along the seam so that with a flat surfaced roller the central portion of the seam would possibly move out of contact with the roller and result in a discontinuity of the soldered seam. This defect is obviated by the use of the helical thread. The pitch of the thread is preferably adjusted so that there will be two points of contact with the side seam of the can during the time that the entire length of the can is above the roller, and therefore in operation a rocking motion is imparted to the can which ensures the maintenance of an even soldering contact of the seam of the can and the helical thread of the roller.

The fact that there are only two contact points between the can and the roller also reduces the friction between the latter and greatly minimizes the tendency of the can to rotate during the soldering operation. In addition, a longer period of soldering contact between the seam and the roller is achieved, whereby increased speed of operation can be attained.

In view of the above it is apparent that an object of the present invention is to provide a mechanism for soldering the side seams of can bodies which applies solder to such side seams and wipes off the excess solder in one continuous operation;

Another object is to provide a device which avoids splattering of solder inside the cans during the soldering of the side seams and the removal of excess solder from such seams;

An additional object is to eliminate the use of brushes to remove the excess solder from the side seams of cans after the soldering of such seams;

A further object is to provide a solder roller mechanism which will give a continuous soldered side seam on can bodies irrespective of the bending of the side seam during the soldering operation.

Other objects and features of the present invention will become apparent in the following disclosure and drawings, in which:

Fig. 1 shows a partially sectionalized side elevation of the can transporting mechanism, solder roller, and bath.

Fig. 2 shows a sectionalized end view of the can transporting mechanism, solder roller, and bath, taken along line 2—2 of Fig. 1.

In Fig. 1 the solder roller 10 is shown as having a tapered or conical body portion 11 with a larger diameter receiving end 12 and a smaller diameter discharge end 13. The outer surface of the roller 10 has a raised helical thread 14 along its length. This thread is preferably flat as shown, although it may also be curved if so desired, however, the flat thread affords an optimum contact area for delivering solder to the can seam. Likewise, the thread may be either a left-hand or right-hand thread depending on the requirements for the particular embodiment.

Between the adjacent portions of the thread are grooved surfaces 15 which are preferably of triangular shape and which taper radially inwardly from immediately adjacent the thread as shown. It is possible to have other shapes of grooves, such as square or concave, but the present design gives good drainage of excess solder back to the bath as well as a smooth gradual contact path for the can body 16 in passing from one portion of the thread to another.

The solder roller 10 is rotatably mounted or journaled at its ends 17, 18 to the end plates 19, 20 respectively of the tank or trough 21 by conventional respective bushings 22, 23. Any suitable means for rotating the roller can be connected to the roller externally of the trough.

The elongated trough 21 is constructed with straight vertical end plates 19, 20 and has a longitudinally slanted, transversely curved bottom 22' and downwardly and inwardly slanting sides 23, 24 joined to the bottom and end plates 19, 20 to define a basin or container with an open top (see also Fig. 2). Thus, an elongated trough or tank is provided which has a larger cross-sectional and deeper end portion 25 to the left and tapers gradually to a smaller shallower end portion 26 to the right as shown in Fig. 1.

Means for draining the trough, for adding solder, and for heating the same should be included although they have not been indicated.

The trough is designed in this particular fashion to minimize the size of bath required, although it is possible to use any suitable trough construction if bath size is deemed unimportant.

A bath of molten solder 27 is maintained in the trough at the level indicated in Figs. 1 and 2. The roller is axially oriented relative to the bath by its attachment to the end plates 19, 20 as aforementioned so that the larger diameter receiving end 12 is immersed in the bath up to its axis or center 28 and the smaller diameter discharge end 13 is disposed above the bath so that the helical thread portion 29 at the latter end will just break the surface of the bath when the said portion is at its lowest point of rotational movement. At such lowest point the said thread portion lies roughly in the same horizontal plane as the center 28 of the said receiving end.

The can conveying system may be of any conventional well-known type. One type is shown in Fig. 1 which has an overhead drive chain 30 with spaced hooks or fingers 31 which engage the upper rearward ends 32 of the can bodies 16 and propel the latter from the receiving end 12 to the discharge end 13 of the roller 10 in the direction shown by arrow A. Side guides 33, 34 steady the can bodies 16 laterally. By the above-described conveying system the side seam 35 of the can body is maintained in contact with the helical thread in at least two points 36, 37 throughout most of its travel, or in other words throughout the time that the entire can body is in overlying relation to the roller.

As shown in Fig. 1 by attaching the roller 10 to the trough 21 so that the larger diameter receiving end 12 and smaller diameter discharge end 13 of the roller are respectively positioned in the larger deeper end portion 25 and the smaller shallower end portion 26 of the trough 21, the bottom portion 38 of the roller lies parallel to the bottom 22 of the trough and provides an arrangement using a sufficient but not excessively large bath of molten solder. At the same time the top portion 39 of the roller lies horizontal and is therefore parallel to the path of the cans being conveyed overhead.

The pitch of the helical thread, i. e., the distance between adjacent portions of such thread measured parallel to the axis of the roller, is constructed so that it is approximately one half the length of the can body. This provides two contact points 36, 37 as mentioned above, and as the can body is passing along in contact therewith a slight rocking motion is imparted to the can body and even if the side seam 35 bends inwardly due to the heat from the roller, such rocking motion will maintain continuous contact between the body and the helical thread. It is possible, of course, that certain particular conditions of operation or manufacture might justify using a different pitch to the thread so that either only one contact point will be maintained between the roller and can body at any one time, or more than two contact points will be maintained, but the present arrangement provides the optimum conditions of operation.

Similarly the thread may be either left-handed or right-handed, and the direction of rotation of the roller 10 selected as desired to provide the preferred relative speed of can body to roller. The roller will be assumed for the present description to rotate in a clockwise direction, as viewed in Fig. 2.

In operation the side seam 35 at the leading edge 40 of the can body 16 is moved into engagement with the helical thread 14 at the receiving end 12 of the roller 10. The latter proceeds to heat the said seam and deposit solder thereon. Due to the relative rotation of the roller and the movement of the can as carried by the conveyor system, the thread wipes along the said seam from right to left as viewed in Fig. 1, and as the can moves farther to the right eventually engages another portion of the helical thread. From then until the can starts to leave the discharge end 13 of the roller, there will be two points of contact.

As the can proceeds from left to right as viewed in Fig. 1, the roller applies gradually less and less solder to the seam until at the discharge end 13 the roller is wiping the excess solder from the seam and returning such excess to the bath.

While one embodiment of this invention has been shown and described, it is apparent that certain changes could be made by those skilled in the art without departing from the scope and spirit of this invention.

I claim:

1. A soldering mechanism comprising a tank of molten solder, a solder roller partially immersed in said solder and rotatably attached to said tank; said roller consisting of a body portion tapering axially from a larger diameter receiving end to a smaller diameter discharge end, and a raised helical thread peripherally disposed along said body portion; said roller axially disposed with the helical thread portion at said discharge end rotatable into the same horizontal plane with the center of the receiving end at the lowest point of rotation of said portion.

2. A mechanism for soldering the side seams of can bodies comprising a bath of molten solder, a solder roller partially immersed along its length in said bath and rotatably disposed relative to said bath; said roller consisting of a conical body portion having a larger diameter end and a smaller diameter end, and a raised helical thread disposed along the outer surface of said body portion; said roller axially disposed relative to said bath so that said larger diameter end is immersed in said bath up to its axis and the helical thread at said smaller diameter end just breaks the surface of said bath at the lowest point of rotational movement.

3. A soldering mechanism comprising a molten solder bath and a solder roller partially immersed along its length in said bath and rotatably disposed relative to the same; said roller consisting of a longitudinally tapered body portion having a larger diameter receiving end and a smaller diameter discharge end, a raised helical thread disposed along the surface of said body portion, and triangular grooves between adjacent portions of said thread; said roller axially oriented relative to said bath so that said receiving end is immersed in said bath up to its axis and the helical thread at said discharge end just breaks the surface of said bath at the lowest point of rotational movement.

4. A soldering mechanism comprising a molten solder bath and a solder roller partially immersed along its length in said bath and rotatably disposed relative to the same; said roller consisting of a longitudinally tapered body portion having a larger diameter receiving end and a smaller diameter discharge end, a raised flat helical thread disposed along the surface of said body portion, and triangular grooves between adjacent portions of said thread tapering radially inward immediately adjacent said thread; said roller axially oriented relative to said bath so that said receiving end is immersed in the same up to its axis and the helical thread at said discharge end just breaks the surface of said bath at the lowest point of rotational movement.

5. A mechanism for soldering the side seams of can bodies comprising an elongated trough consisting of straight vertical ends, a longitudinally slanted, transversely curved bottom, and downwardly and inwardly slanted sides joining said bottom and said ends to define an open container tapering from a larger deeper end portion to a smaller shallower end portion; a bath of molten solder confined in said trough; a solder roller rotatably journaled at its ends in the respective said ends of said trough, said roller consisting of a longitudinally tapered body portion having a larger diameter receiving end and a smaller diameter discharge end, and a raised helical thread disposed along the surface of said body portion, the receiving end and discharge end of said roller being adjacent the deeper and shallower end portions respectively of said trough; said roller axially oriented relative to said bath so that said receiving end is immersed in the same up to its axis and the helical thread at said discharge end just breaks the surface of said bath at the lowest point of rotational movement; and means for conveying cans to be soldered longitudinally relative to the upper surface of said roller and with the side seams of said cans in contact with said helical thread.

6. A mechanism for soldering the side seams of can bodies comprising an elongated trough consisting of straight vertical ends, a longitudinally slanted, transversely curved bottom, and downwardly and inwardly slanted sides joining said bottom and said ends to define an open container tapering from a larger deeper end portion to a smaller shallower end portion; a bath of molten solder confined in said trough; a solder roller rotatably journaled at its ends in the respective said ends of said trough, said roller consisting of a longitudinally tapered body portion having a larger diameter receiving end and a smaller diameter discharge end, and a raised flat helical thread disposed along the surface of said body portion, the receiving end and discharge end of said roller being adjacent the deeper end and shallower end portions respectively of said trough and the tapered body portion lying parallel to said curved bottom; said roller axially oriented relative to said bath so that said receiving end is immersed in the same up to its axis and the helical thread at said discharge end just breaks the surface of said bath at the lowest point of rotational movement; and means for conveying cans to be soldered longitudinally relative to the upper surface of said roller from the receiving end to the discharge end of the latter and with the side seams of said cans in contact with said helical thread at two adjacent points of the same while the entire can body is passing over the roller.

References Cited in the file of this patent
UNITED STATES PATENTS

| | | |
|---|---|---|
| 2,148,218 | Prince | Feb. 21, 1939 |
| 2,294,422 | Reid | Sept. 1, 1942 |